United States Patent [19]

Ogawa et al.

[11] 4,135,016
[45] Jan. 16, 1979

[54] MAGNETIC RECORDING MATERIAL

[75] Inventors: Hiroshi Ogawa; Matsuaki Nakamura; Masashi Aonuma; Yasuo Tamai, all of Odawara, Japan

[73] Assignee: Fuji Photo Film Co., Ltd., Minami-ashigara, Japan

[21] Appl. No.: 776,076

[22] Filed: Mar. 9, 1977

[30] Foreign Application Priority Data

Mar. 10, 1976 [JP] Japan .................. 51/25707

[51] Int. Cl.$^2$ ............................................. H01F 10/02
[52] U.S. Cl. ........................................ 428/64; 428/329; 428/337; 428/447; 428/900
[58] Field of Search .................. 427/128–132, 427/48; 428/900, 447, 451, 64, 329, 337; 252/62.54

[56] References Cited

U.S. PATENT DOCUMENTS

| | | | |
|---|---|---|---|
| 3,996,407 | 12/1976 | von Gross et al. | 427/128 X |
| 4,007,314 | 2/1977 | Higuchi et al. | 427/128 X |

Primary Examiner—Bernard D. Pianalto
Attorney, Agent, or Firm—Sughrue, Rothwell, Mion, Zinn and Macpeak

[57] ABSTRACT

A magnetic recording material, which comprises a non-magnetic support having thereon a magnetic layer containing ferromagnetic powder dispersed in a binder, with the magnetic layer containing an organic silicone compound represented by the following general formula (I);

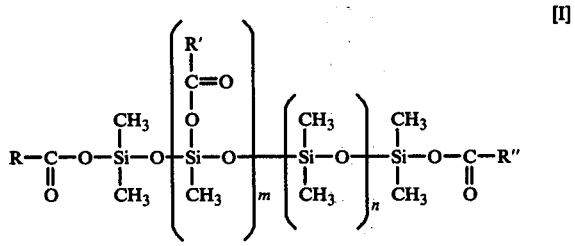

wherein R, R' and R", which may be the same or different, each has 7 to 21 carbon atoms and represents an alkyl group, an alkenyl group, an alkadienyl group, an alkatrienyl group or an alkatetraenyl group, m represents an integer of 1 to 100; n represents an integer of 0 to 250; and $m+n \leq 300$ and $m \geq n/5$.

23 Claims, 2 Drawing Figures

FIG 1
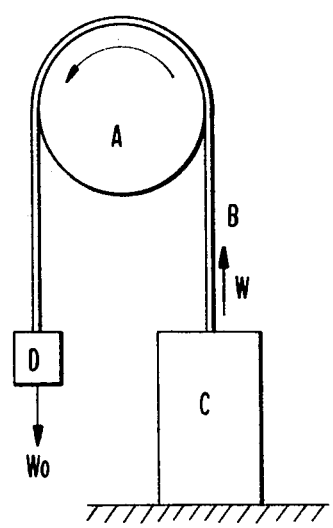
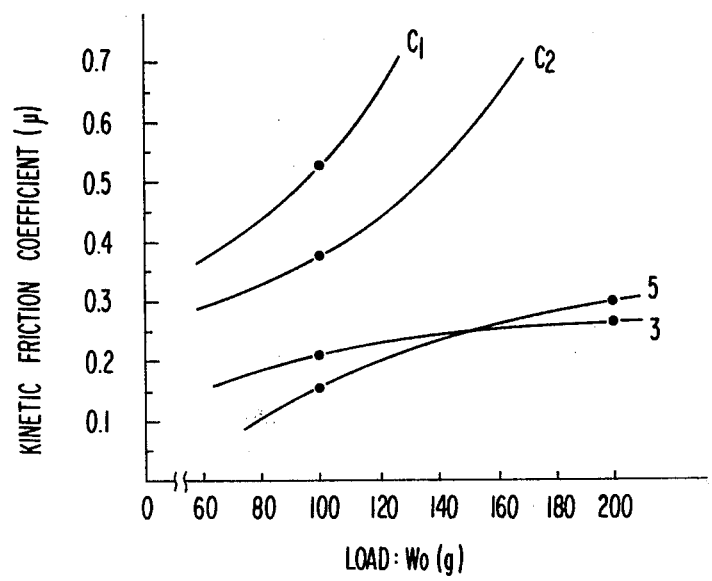
FIG 2

MAGNETIC RECORDING MATERIAL

BACKGROUND OF THE INVENTION

1. Field of the Invention

The present invention relates to a magentic recording material and, more particularly, to a magnetic recording material which enables a large amount of information to be recorded in a small area of recording, and which has excellent sliding properties and durability.

2. Description of the Prior Art

Magnetic recording materials, particularly video tapes, must have a small coefficient of friction and ensure smooth and stable tape-running for a long time since they run in contact with a fixed head, drums, guide poles or the like. In addition, they must possess excellent durability since they are vigorously rubbed with a rotary magnetic head.

Therefore, incorporation of higher fatty acids, higher fatty acid esters, paraffin hydrocarbons, silicone oils (e.g., dimethylpolysiloxane, diphenylpolysiloxane, etc.), or the like in a magnetic coating containing a ferromagnetic powder and a binder has been previously employed. In particular, silicone oils have often been employed since good effects are obtained even when a small amount of silicone oil is used.

These additives discussed above are described in Japanese Patent Publication Nos. 18064/66, 186,68, 669/68, 15624/72, U.S. Patents 2,654,681, 3,470,021, 3,497,411, 3,525,694, 3,634,253, etc.

However, sufficient sliding property and durability required for video tapes have not been achieved with these conventional additives. In addition, a so-called blooming phenomenon of these additives oozing out on the surface of a magnetizable layer has tended to occur, which leads to sticking of tapes upon storage.

Organic silicone compounds represented by the following general formula [II] (as described in Japanese Patent Publication No. 14249/74)

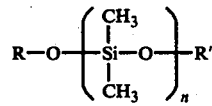
[II]

wherein R and R' each represents a hydrocarbyl group having 7 to 26 carbon atoms, and n represents an integer of 1 to 20; and the following general formula [III] (as described in Japanese Patent Application (OPI) No. 32904/75).

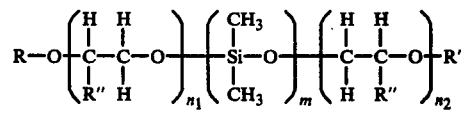
[III]

wherein R and R' each represents a hydrocarbyl group having 8 to 18 carbon atoms, R" represents a hydrogen atom or a methyl group, $15 \geq m \geq 1$, and $16 \geq (n_1 + n_2) \geq 2$; are also known.

However, durability is not improved with the compounds represented by the above general formula [II] and, in addition, these compounds have such a low compatibility with a binder that they cause the blooming phenomenon, which is disadvantageous, to occur. The reason for this may be the bond between the hydrocarbyl group and silicon atom is an ether bond and such has a low degree of polarity, although this is not certain.

Also, the compounds represented by the above general formula [III] have been found to be disadvantageous since they exhibit such a high kinetic coefficient of friction with a head drum of video tape recorders upon high load being applied that squeaking with the drum sometimes occurs. In addition, durability is not improved very much with these compound. This may be attributed to the hydrophilic alkyleneoxide chain in the molecule, although again this is not certain.

SUMMARY OF THE INVENTION

A primary object of the present invention is to provide a novel magnetic recording material which does not have the above-described defects.

Another object of the present invention is to provide a magnetic recording material which has excellent sliding properties and ensuring stable running.

A further object of the present invention is to provide a magnetic recording material having excellent abrasion resistance and excellent durability.

Still a further object of the present invention is to provide a magnetic recording material which does not cause a blooming phenomenon.

As a result of examining various organic silicone compounds, it has now been found that remarkably favorable results can be obtained by using an organic silicone compound represented by the following general formula [I] as an additive, thus achieving the present invention.

That is, the present invention comprises a magnetic recording material, which comprises a non-magnetic support having provided thereon a magnetic layer containing a ferromagnetic powder dispersed in a binder, the magnetizable layer containing an organic silicone compound or compounds represented by the following general formula [I];

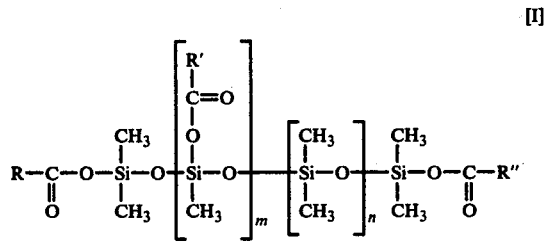
[I]

where R, R' and R", which may be the same or different, each has 7 to 21 carbon atoms, and represents an alkyl group, an alkenyl group, an alkadienyl group, an alkatrienyl group or an alkatetraenyl group, m represents an integer of 1 to 100, n represents an integer of 0 to 250, provided that $m + n \leq 300$ and $m \geq n/5$.

BRIEF DESCRIPTION OF THE DRAWINGS

FIG. 1 is a schematic illustration of an apparatus for measuring the knetic coefficient of friction ($\mu$) in the Examples of the present invention wherein A designates a drum, B a sample tape, C a tension-detecting member, D a weight, Wo a load by weight D, and W a tension.

FIG. 2 is a graph showing the relationship between load (Wo: g) applied to the samples in Example 1 and the kinetic friction coefficient ($\mu$).

DETAILED DESCRIPTION OF THE INVENTION

Substituents R, R' and R" in the organic silicone compounds of the present invention represented by the above general formula [I] include saturated or unsaturated straight or branched chain groups, such as alkyl, alkenyl, alkadienyl, alkatrienyl or alkatetraenyl groups, preferably alkyl or alkenyl groups, having 7 to 21 carbon atoms, and, more preferably, saturated fatty acid residues such as capryl (n-octanoyl), pelargonyl (n-nonanoyl), capryl (n-decanoyl), undecyl (undecanoyl), lauryl (n-dodecanoyl), tridecyl (n-tridecanoyl), pendadecyl (n-pentadecanoyl), palmityl (n-hexadecanoyl), heptadecyl (margaryl, n-heptadecanoyl), stearyl (n-octadecanoyl), nonadecyl (n-nonadecanoyl), arachidyl (n-eicosanoyl), behenyl (n-docosanoyl), etc., and unsaturated fatty acid residues such as lauroleyl (9-dodecenoyl), 4-tetradecanoyl, zoomaryl (9-hexadecenoyl), petroselinyl (6-octadecenoyl), oleyl (9-octadecenoyl), elaidyl (9-octadecenoyl), vaccenyl (11-octadecenoyl), linoleyl (9,12-octadecadienoyl), eleostearyl (9,11,13-octadecatrienoyl), linolenyl (9,12,15-octadecatrienoyl), parinaryl (9,11,13,15-octadecatetraenoyl), arachidonyl (5,8,11,14-eicosatetraenoyl), gadoleyl (9-eicosenoyl), erucyl (13-docosenoyl), brassylyl (13-docosenoyl), etc.

Specific examples of the compounds represented by the general formula [I] are illustrated below.

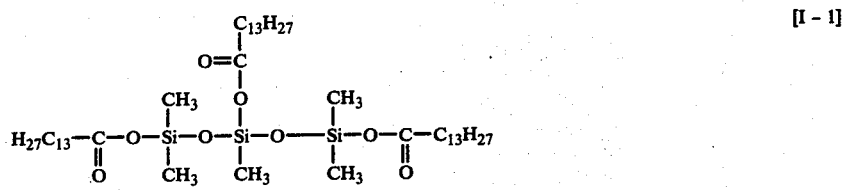
[I - 1]

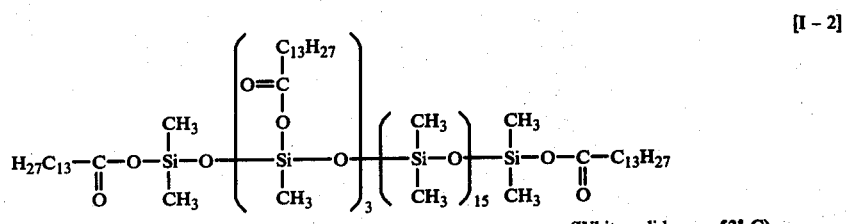
[I - 2]
(White solid, m.p. 52° C)

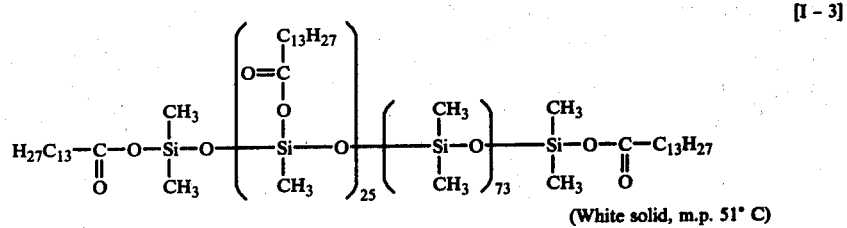
[I - 3]
(White solid, m.p. 51° C)

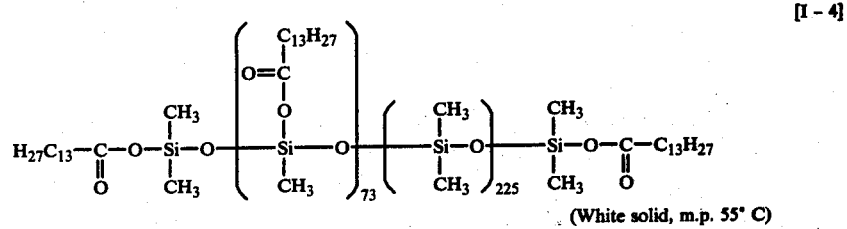
[I - 4]
(White solid, m.p. 55° C)

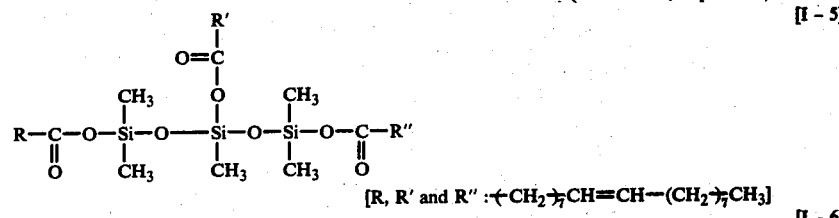
[I - 5]
[R, R' and R" : $-(CH_2)_7-CH=CH-(CH_2)_7-CH_3$]

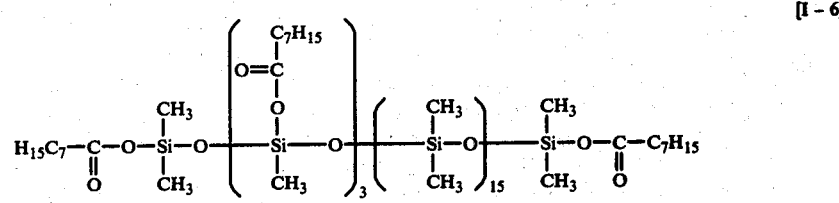
[I - 6]

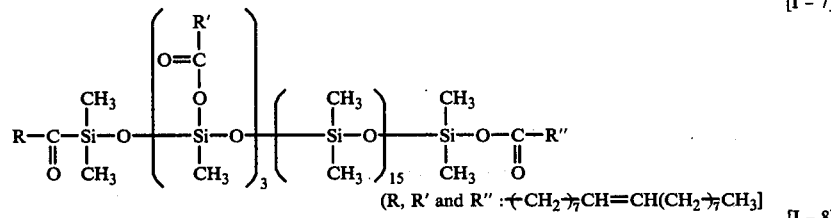

[I - 7]

(R, R' and R'' : $\text{+CH}_2\text{+}_7\text{CH=CH(CH}_2\text{+}_7\text{CH}_3$]

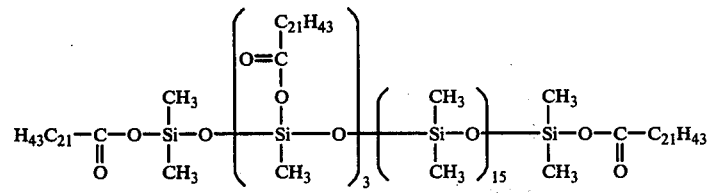

[I - 8]

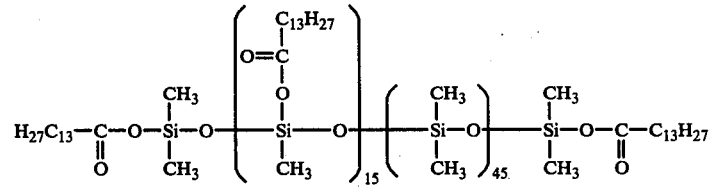

[I - 9]

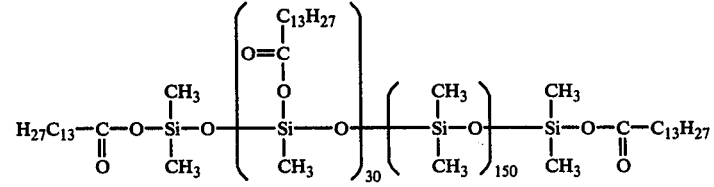

[I - 10]

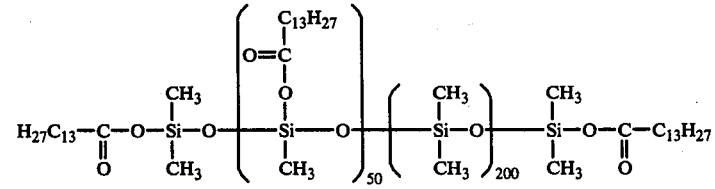

[I - 11]

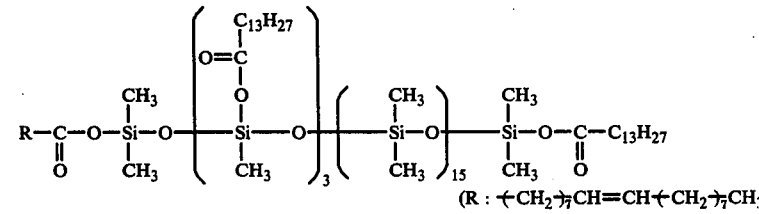

[I - 12]

(R : $\text{+CH}_2\text{+}_7\text{CH=CH+CH}_2\text{+}_7\text{CH}_3$]

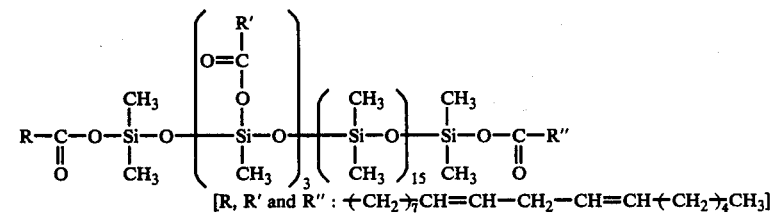

[I - 13]

[R, R' and R'' : $\text{+CH}_2\text{+}_7\text{CH=CH—CH}_2\text{—CH=CH+CH}_2\text{+}_4\text{CH}_3$]

In the foregoing general formula [I], saturated or unsaturated hydrocarbyl groups represented by R, R' and R" preferably contain 7 to 21 carbon atoms, and R, R' and R" may be the same or different. If the substituents contain less than 7 carbon atoms, abrasion resistance cannot be improved, whereas if the substatuents contain more than 21 carbon atoms, the starting material is difficult to obtain on an industrial scale and, in addition, it has been confirmed that the effect of reducing the kinetic coefficient of friction is decreased. Further, it is difficult to obtain the unexpected results of the present invention where R, R' or R" is an aryl group.

m represents an integer of 1 to 100, and n represents an integer of 0 to 250, preferably with m+n≦300 and m≧n/5. If m+n>300 or m<n/5, no improvement of the kinetic coefficient of friction and durability is observed. Particularly preferably, $m+n \leq 100$ and $m \geq n/5$.

The above described organic silicone compounds of the present invention can be used individually as a combination of two or more thereof.

The objects of the present invention are attained by incorporating the organic silicone compounds represented by the general formula [I] into the magnetic layer in an amount of about 0.1 to about 5 parts by weight, preferably 0.2 to 3 parts by weight, per 100 parts by weight of the ferromagnetic powder. If the compound is incorporated in an amount of less than about 0.1 part by weight, reduction in the kinetic coefficient of friction is observed, whereas if more than 5 parts by weight is incorporated, the blooming phenomenon tends to occur, the strength of the resulting magnetic layer is reduced and abrasion resistance is deteriorated.

The process for synthesizing the organic silicone compounds of the present invention represented by the general formula [I] and synthesis examples thereof are illustrated below.

Processes for preparing the organic silicone compounds of the present invention represented by the general formula [I] are known. The following synthesis processes, can be used:

(1) One process comprises synthesizing methyl hydrogen polysiloxane represented by the following general formula;

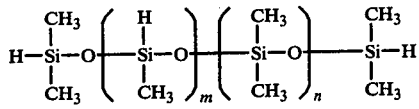

using an equilibration reaction between tetramethyldisiloxane [H(CH$_3$)$_2$Si]$_2$O, cyclic dimethylsiloxane [(CH$_3$)$_2$SiO]$_n$ and cyclic methyl hydrogen siloxane [H(CH$_3$)SiO]$_m$, e.g., as described in W. Noll, *Chemistry and Technology of Silicones*, Academic Press (1968), and conducting a dehydrogenation reaction with a saturated or unsaturated fatty acid represented by the general formula RCOOH in an at least molar equivalent amount to the active hydrogen atom, in the presence of a metal catalyst, preferably zinc, cadmium, etc.

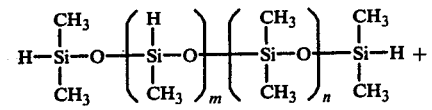

(m + 2)RCOOH 

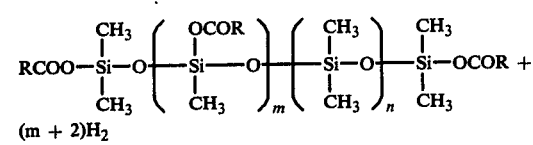

(m + 2)H$_2$ 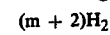

wherein R, m, m$_1$, and n are as described previously, also described in W. Noll, supra.

(2) A second process comprises conducting an equilibration reaction between a partly hydrolyzed product of methyltrialkoxysilane;

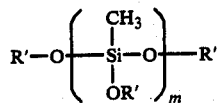

and cyclic dimethylpolysilane [(CH$_3$)$_2$SiO]$_n$ to obtain a methyl-alkoxypolysiloxane, e.g., as described in W. Noll, supra, and French Patent No. 1,116,196;

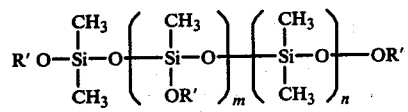

wherein R', m and n are as described previously, and subjecting the product to an ester interchange reaction with a saturated or unsaturated fatty acid represented by the general formula RCOOH in the presence of an acid or alkali catalyst

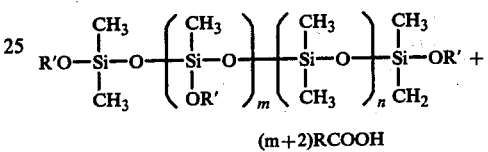

(m+2)RCOOH

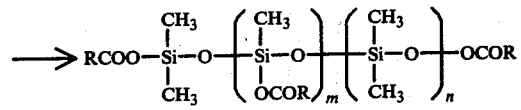

wherein R, R', m, and n are as described previously, also described in W. Noll, supra.

(3) A further synthetic process comprises reacting methylchloropolysiloxane of the general formula,

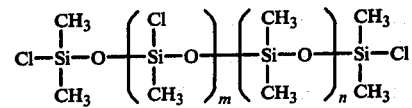

obtained by the equilibration reaction between dimethyldichlorosilane (CH$_3$)$_2$SiCl$_2$ and a methyltrichlorosilane CH$_3$SiCl$_3$ partially hydrolyzed product, or between cyclic dimethylsiloxane [(CH$_3$)$_2$SiO]$_n$ and methyltrichlorosilane or the partially hydrolyzed product thereof, with a saturated or unsaturated fatty acid RCOOH in the presence of a hydrogen chloride-acceptor such as an organic amine, e.g., under conditions as described in W. Noll, supra,

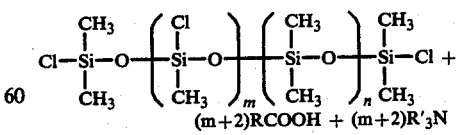

(m+2)RCOOH + (m+2)R'$_3$N

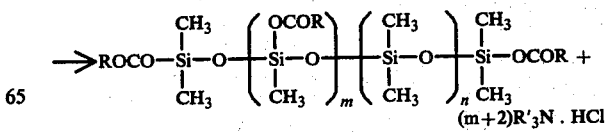

(m+2)R'$_3$N . HCl wherein R, R', m, and n are as described previously.

Of these processes, process (1) is particularly excellent and enables the compounds of the general formula [I] to be synthesized in a good yield.

Specific examples of synthesizing the compounds of the general formula [I] are shown below. Unless otherwise indicated herein, all parts, percents, ratios and the like are by weight.

SYNTHESIS EXAMPLE 1:

Synthesis of Compound [I-1]

Tetramethyldisiloxane [H(CH$_3$)$_2$Si]$_2$O (b.p. 72° C.) and tetramethylcyclotetrasiloxane [H(CH$_3$)SiO]$_4$ were mixed with each other in a molar ratio of 4:1 and subjected to an equilibration in the presence of H$_2$SO$_4$ catalyst, e.g., as described in D. W. Scott; *Journal of the American Chemical Society*, 68, 2294 (1946), W. Patnode, et al; *Journal of the American Chemical Society*, 68, 358 (1946). After distillation, pentamethyltrihydrogentrisiloxane [H(CH$_3$)$_2$—Si—OSi(CH$_3$)H—O—Si(CH$_3$)$_2$H] (b.p. 117° C.) was obtained in a yield of 32%.

149 g (1 mol) of the thus obtained trisiloxane, 432 g (3 mols) of caprylic acid, 300 g of toluene and 1.0 g of Zn dust (as a catalyst) were heated under stirring. The reaction proceeded with the generation of hydrogen. Heating was continued for 3 hours under reflux of toluene, and the catalyst was removed through filtration. Upon distilling off the toluene under reduced pressure, 577 g (yield: 93%) of white and waxy Compound [I-1] having a melting point of about 50° C. was obtained.

SYNTHESIS EXAMPLE 2:

Synthesis of Compounds [I-2] and [I-7]

288 g (0.2 mol) of methyl hydrogen polysiloxane having an average formula of [H(CH$_3$)$_2$SiO(CH$_3$HSiO)$_3$((CH$_3$)$_2$SiO)$_{15}$—OSi(CH$_3$)H] obtained by the equilibration reaction between tetramethyldisiloxane of [H(CH$_3$)$_2$Si]$_2$O, octamethylcyclotetrasiloxane [(CH$_3$)$_2$SiO]$_4$ and tetramethylcyclotetrasiloxane [H(CH$_3$)SiO]$_4$, 137 g (0.6 mol) of myristic acid, 200 g of toluene and 0.5 g of Zn dust (added as a catalyst) were heated under stirring. Generation of H$_2$ was observed. The reaction was conducted for 3 hours under reflux of toluene. The catalyst was removed through filtration and, upon distilling off the toluene under reduced pressure, 396 g (yield: 93.5%) of white and waxy Compound [I-2] having a melting point of about 52° C. was obtained.

In the same manner as in the above-described process except for using oleic acid [C$_{17}$H$_{33}$COOH] in place of myristic acid, pale yellow and liquid Compound [I-7] in a yield of 95% was obtained.

SYNTHESIS EXAMPLE 3:

Synthesis of Compound [I-4]

234 g (0.01 mol) of methylmethoxypolysiloxane having an average formula of [(CH$_3$O)(CH$_3$)$_2$SiO[(CH$_3$O)(CH$_3$)SiO]$_{73}$ [(CH$_3$)$_2$SiO]$_{225}$ Si(CH$_3$)$_2$(OCH$_3$)] obtained by the equilibration reaction between octamethylcyclotetrasiloxane [(CH$_3$)$_2$SiO]$_4$ and a partially hydrolyzed product of methyltrimethoxysilane,

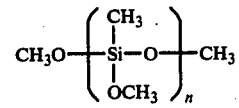

171 g (0.75 mol) of myristic acid [C$_{13}$H$_{27}$COOH], 400 g of toluene and 1 g of CF$_3$COOH (added as a catalyst) were heated under stirring. The methanol generated was removed together with the toluene using an ester adapter. Almost the theoretical amount of methanol was distilled off. Upon distilling off the toluene under reduced pressure, 361 g (yield: 95%) of white and waxy Compound [I-4] having a melting point of about 55° was obtained.

Additionally, the organic silicone compounds of the present invention contain, in some cases, a slight amount e.g., about 20 mol % or less, of the Si–H bonds as a component unreacted during synthesis, such, however, does not impair the effects of the present invention at all.

The reason for the greater sliding effects achieved in using silicone compounds described above in a magnetic layer according to the present invention than that achieved with conventional dimethylpolysiloxane is unknown. However, it may be postulated that the fatty acid groups at the terminals and in the side chains increase the strength of an oil film when such is pressed against a video head or the like with high pressure.

The magnetic recording material of the present invention is prepared by coating on a non-magnetizable support a magnetic coating composition prepared by kneading and dispersing ferromagnetic powder, a binder and one or more organic silicone compounds represented by the general formula [I] in an organic solvent, and drying to form a magnetic layer.

Processes for preparing the magnetic coating composition which is used in the present invention are described in detail in Japanese Patent Publication Nos. 15/60, 26794/64, 186/68, 28043/72, 28045/72, 28046/72, 28048/72, 31445/72, 11162/73, 21331/73, 33683/73, Russian Patent 308,033, U.S. Pat. Nos. 2,581,414, 2,855,156, 3,240,621, 3,526,598, 3,728,262, 3,790,407 and 3,836,393, etc. The magnetic coating compositions described therein contain a ferromagnetic powder, a binder and a coating solvent as major components and, in some cases, further contain a dispersing agent, a lubricant, an abrasive, an antistatic agent, and like additives.

Examples of ferromagnetic powders which can be used in the present invention include ferromagnetic iron oxide powder, ferromagnetic chromium dioxide powder, ferromagnetic alloy powder, etc.

The above-described ferromagnetic iron oxide is one having the general formula FeO$_x$ wherein x is in the range of $1.33 \leq x \leq 1.50$, that is, maghemite ($\gamma$—Fe$_2$O$_3$, x = 1.50), magnetite (Fe$_3$O$_4$, x = 1.33) or the Berthollide compounds thereof (FeO$_x$, $1.33 < x < 1.50$). The above-described x is represented by the following formula;

$$x = \frac{1}{2 \times 100} \times \left\{ 2 \times \left( \begin{array}{c} \text{Atomic} \\ \text{\% of di-} \\ \text{valent} \\ \text{ion} \end{array} \right) + 3 \times \left( \begin{array}{c} \text{Atomic} \\ \text{\% of tri-} \\ \text{valent} \\ \text{ion} \end{array} \right) \right\}$$

To these ferromagnetic iron oxides may be added divalent metals. Examples of such divalent metals are Cr, Mn, Co, Ni, Cu, Zn, etc., and they can be added in an amount of 0 to about 10 atomic % based on the iron oxide.

The above-described ferromagnetic chromium dioxide which can be used includes $CrO_2$ per se and $CrO_2$ to which 0 to about 20 wt % of metals such as Na, K, Ti, V, Mn, Fe, Co, Ni, Tc, Rn, Sn, Ce, Pb, etc., semi metals such as P, Sb, Te, etc. or oxides of these metals has been added.

The above-described ferromagnetic iron oxide and ferromagnetic chromium dioxide particles have an axial ratio of preferably in the range of about 2:1 to about 20:1, preferably 5:1 to 10:1 and average length in the range of about 0.2 to about 2.0 μm, preferably 0.5 to 1.5 μm.

The above-described feeromagnetic alloy powder is one which contains about 75 wt % or more metal component, with about 80 wt % or more of the metal component being at least one ferromagnetic metal (i.e., Fe, Co, Ni, Fe—Co, Fe—Ni, Co—Ni or Co—Ni—Fe) and about 20 wt % or less, preferably 0.5 to 5 wt %, of the metal component being Al, Si, S, Sc, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. In some cases, the ferromagnetic alloy contains a slight amount of water, hydroxides or oxides.

The above-described ferromagnetic alloy powders contain needle-like particles of a length of about 50 to about 1,000 Å, and 2 to about 20 of which are linked to each other to form a chain.

More specifically, they are described in Japanese Patent Publication Nos. 5515/61, 4825/62, 5009/64, 10307/64, 14090/69, 18372/70, 22062/72, 22513/72, 28466/71, 38755/71, 4286/72, 12422/72, 17284/72, 18509/72, 18573/72, 39639/73, U.S. Pat. Nos. 3,026,215, 3,031,341, 3,100,194, 3,242,005, 3,389,014, British Patent Nos. 752,659, 782,762, 1,007,323, French Patent No. 1,107,654, West German Patent Application (OLS) No. 1,281,334, etc.

Conventionally known thermoplastic resins, thermosetting resins, reactive resins or mixtures thereof can be used as the binder in the present invention.

Examples of thermoplastic resins which can be used are those which have a softening point of not higher than about 150° C., a mean molecular weight of about 10,000 to about 200,000 and polymerization degree of about 200 to about 2,000, such as vinyl chloride-vinyl acetate copolymers, vinyl chloride-vinylidene chloride copolymers, vinyl chloride-acrylonitrile copolymers, acrylic ester-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride, vinylidene chloride-acrylonitrile copolymers, butadiene-acrylonitrile copolymers, polyamide resins, polyvinyl butyrals, cellulose derivatives (e.g., cellulose acetate butyrate, cellulose diacetate, cellulose triacetate, cellulose propionate, nitrocellulose, etc.), styrene-butadiene copolymers, polyester resins, amino resins, various synthetic thermoplastic resins (polybutadiene, polychloroprene, polyisoprene, styrene-butadiene copolymer, etc.), and mixtures thereof.

Illustrative examples of these resins are described in Japanese Patent Publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72 22069/72, 22070/72, 27886/73, U.S. Pat. Nos. 3,144,352, 2,419,420, 3,499,789, 3,713,887.

Examples of thermosetting resins or reactive resins which can be used include those which have a molecular weight of not more than about 200,000 before coating and, upon being heated after coating and drying, the molecular weight becomes infinite through condensation reactions, addition reactions or the like. Of these resins, those which do not soften or melt before the resin thermally decomposes are preferable. More specifically, examples which can be used include phenolformaldehyde novolak resins, phenol-formaldehyde resole resins, phenol-furfural resins, xylene-formaldehyde resins, urea resins, melamine resins, drying oil-modified alkyd resins, phenol resin-modified alkyd resins, maleic acid-modified alkyd resins, unsaturated polyester resins, a combination of an epoxy resin and a hardening agent therefor (polyamines, acid anhydrides, polyamide resins, etc.), terminal isocyanato-containing, moisture-hardenable polyester resins, terminal isocyanato-containing, moisture-hardenable polyether resins, polyisocyanate prepolymers (compounds obtained by reacting a diisocyanate with a low molecular weight triol, having 3 or more isocyanato groups within the molecule; a trimer and tetramer of diisocyanates), a combination of a polyisocyanate prepolymer and a resin having an active hydrogen (polyesterpolyols, polyetherpolyols, acrylic acid copolymers, maleic acid copolymers, 2-hydroxyethyl methacrylate copolymers, p-hydroxystyrene copolymers, etc.) and mixtures thereof.

Illustrative examples of these resins are described in Japanese Patent Publication Nos. 8103/64, 9779/65, 7192/66, 8016/66, 14275/66, 18179/67, 12081/68, 28023/69, 14501/70, 24902/70, 18103/71, 22065/72, 22066/72, 22067/72, 22072/72, 22073/72, 28045/72, 28048/72, 28922/72, U.S. Pat. Nos. 3,144,353, 3,320,090, 3,437,510, 3,597,273, 3,781,210, 3,781,211.

These binders can be used indurdually or in combination. In addition, additives are added to the binder. A suitable proportion of the ferromagnetic powder and the binder is such that about 10 to about 400 parts by weight, preferably 30 to 200 parts by weight, more preferably 15 to 100 parts by weight, of the binder is used per 100 parts by weight of the ferromagnetic powder.

A dispersing agent, a lubricant, an abrasive, an antistatic agent, or the like may be added as additives to the magnetic recording layer in addition to the above-described binder and the ferromagnetic powder.

Dispersing agent which can be used include fatty acids having 12 to 18 carbon atoms ($R_1COOH$: where $R_1$ is an alkyl or alkenyl group having 11 to 17 carbon atoms) such as caprylic acid, capric acid, lauric acid, myristic acid, palmitic acid, stearic acid, oleic acid, elaidic acid, linoleic acid, linolenic acid, stearolic acid, etc.; metallic soaps comprising an alkali metal (Li, Na, K, etc.) salt or an alkaline earth metal (Mg, Ca, Ba etc.) salt of the above-described fatty acid; fluorine-containing ester compounds of the above-described fatty acids; amides of the above-described fatty acids; polyalkylene oxide alkylphosphates; lecithin; trialkylpolyolefinoxy quaternary ammonium salts (in which the alkyl moiety contains 1 to 5 carbon atoms, and in which the olefin is ethylene, propylene, etc.); and the like. In addition, higher alcohols having 12 or more carbon atoms and sulfuric acid esters thereof can also be used. These dispersing agents are employed an amount of about 0.5 to 20 parts by weight per 100 parts by weight of the binder. Related descriptions of dispersing agents are given in Japanese Patent Publication Nos. 28369/64, 17945/69, 7441/73, 15001/73, 15002/73, 16363/73, 4121/75, U.S. Pat. Nos. 3,387,993, 3,470,021, etc. The additives of the present invention do not impair the effects of these dispersing agents even when such are used in combination with these dispersing agents.

Examples of lubricants which can be used include electrically conductive fine powders such as carbon black, graphite, carbon black-graft polymers, etc.; inorganic powers such as molybdenum disulfide, tungsten disulfide, etc.; synthetic resin powders such as those of polyethylene, polypropylene, polyethylene-vinyl chloride copolymers, polytetrafluoroethylene, etc.; α-olefin polymers; unsaturated aliphatic hydrocarbons which are liquid at ordinary temperatures e.g., about 0 to 40° C. (compounds wherein an α-unsaturated n-olefin group is connected to terminal carbon atom; number of carbon atoms: about 16 to 22); fatty acid esters between a monocarboxylic fatty acid containing 12 to 20 carbon atoms and a monohydric alcohol having 3 to 12 carbon atoms; and the like. These lubricants can be employed within a range of about 0.2 to about 20 parts by weight per 100 parts by weight of the binder. Related description of suitable lubricants are given in Japanese Patent Publication Nos. 18064/66, 23889/68, 40461/71, 15621/72, 18482/72, 28043/72, 32001/72, 5042/75, U.S. Patent Nos. 3,470,021, 3,492,235, 3,497,411, 3,523,086, 3,625,760, 3,630,772, 3,642,539, *IBM Technical Disclosure Bulletin*, Vol. 9, No. 7, p.779 (1966, Dec.), *ELEKTRONIK*, 1961, NO. 12, p.380, etc.

The organic silicone compounds of the present invention provide particularly advantageous results when such are used in combination with the above-described fatty acid esters.

Examples of abrasives which can be used include those materials generally used such as fused alumina, silicon carbide, chromium oxide, corundum, artificial corundum, diamond, artificial diamond, garnet, emery (major components: corundum and magnetite), and the like. These abrasives have a Mohs' hardness of not less than about 5, and a mean particle size of about 0.05 to about 5 μm, preferably 0.1 to 2 μm. These abrasives can be employed in an amount of about 0.5 to 20 parts by weight per 100 parts by weight of the binder. These are described in detail in Japanese Patent Publication Nos. 18572/72, 15003/73, 15004/73 (U.S. Pat. No. 3,617,378), 39402/74, 9401/75, U.S. Pat. Nos. 3,007,807, 3,041,196, 3,293,066, 3,630,910, 3,687,725, British Patent No. 1,145,349, West German Patent (DT-PS) Nos. 853,211, 1,101,000. When used in combination with these abrasives, the additive in accordance with the present invention reduces the head abrasion due to the abrasive.

Examples of antistatic agents which can be used include electrically conductive powders such as carbon black, graphite, carbon black-graft polymer, etc.; natural surface active agents such as saponin; nonionic surface active agents of the alkyleneoxide type, glycerin type, glycidol type, etc.; cationic surface active agents such as higher alkylamines, quaternary ammonium salts, pyridine or like hetero ring compounds, phosphoniums, sulfoniums, etc.; anionic surface active agents containing acidic groups such as carboxylic acid groups, phosphoric acid groups, sulfate groups, phosphate groups, etc.; amphoteric surface active agents such as aminoacids, aminosulfonic acids, sulfuric acid or phosphoric acid esters of aminoalcohols, etc.

The above-described electrically conductive powders can be used within the range of about 0.2 to about 20 parts by weight per 100 parts by weight of the binder, and the surface active agents can be employed within the range of about 0.1 to about 10 parts by weight per 100 parts by weight of the binder.

Examples of these electrically conductive powders and surface active compounds usable as antistatic agents are described in Japanese Patent Publication Nos. 22726/71, 24881/72, 26882/72, 15440/73, 26761/73, U.S. Patent No. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Patent Nos. 1,077,317, 1,198,450, etc. and, in addition, in references such as Ryohei Oda et al; *Synthesis and Application of Surface Active Agents* (Maki Shoten, 1964), A. M. Schwartz and J. W. Perry; *Surface Active Agnets* (Interscience Publications Inc., 1958), J. P. Sisley; *Encyclopedia of Surface Active Agents, vol.* 2 (Chemical Publishing Co., 1964), *Handbook of Surface Active Agents,* 6th Printing (Sangyo Tosho Co., Ltd., Dec. 20, 1966), etc.

These surface active agents can be used individually in combination. They are generally used as antistatic agents but, in some cases, are used for other purposes, for example, improvement of dispersion and magnetic properties, improvement of sliding properties, or as a coating aid.

The magnetic recording layer of the present invention is formed by dissolving or dispersing the above-described components in an organic solvent, and then kneading, dispersing and coating the composition on a non-magnetizable support, followed by drying. It is possible to orient the magnetic powder in the magnetic layer after coating and before drying the magnetic layer. It is also possible to smoothen the surface of the magnetic layer after drying.

Suitable materials which can be used for the non-magnetic support, include polyesters such as polyethylene terephthalate, polyethylene 2,6-naphthalate, etc.; polyolefins such as polypropylene; cellulose derivatives such as cellulose triacetate, cellulose diacetate, etc.; other synthetics such as polycarbonate; non-magnetic metals such as Cu, Al, Zn, etc.; ceramics such as glass, procelain, etc.

The non-magnetic support may be in any form, e.g., a film, a tape, a sheet, a disc, a card, a drum, etc. and various materials are appropriately selected depending on the form employed.

The thickness of these non-magnetic supports is about 2 to about 50 μm, preferably 3 to 25 μm, in the form of films, tapes or sheets. When in the form of discs and cards, the thickness is about 0.5 to 10 mm and, when the support is in the form of drum, it is made cylindrical, the form of which is determined by the recorder to be used.

When the above-described non-magnetic support is a flexible support such as a film, a tape, a sheet, a thintype flexible disc, or the like, the side opposite the magnetic layer may be back-coated (i.e., coated with a backing layer) for the purpose of preventing generation of static charges, transfer or wow and flutter.

Back coating is described in, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688, 3,761,311, etc.

The ferromagnetic powder, the above-described binder, the organic silicone compound of the general formula [I], a dispersing agnet, a lubricant, an abrasive, an antistatic agent, a solvent and the like are kneaded to prepare a magnetic coating composition.

Upon kneading, the ferromagnetic powder and the individual components described above can be added to the kneader at the same time or individually. For example, a process of adding a ferromagnetic powder to a solvent containing a dispersing agent, and kneading the mixture for a given time to prepare a magnetic coating composition can be used.

In kneading and dispersing the magnetic coating solution, various types of kneaders can be used. For example, a two-rod roll mill, a three-rod roll mill, a ball mill, a pebble mill, a trommel, a sand grinder, a Szegvari attritor, a high speed impeller dispersing machine, a high speed stone mill, a high speed impact mill, a disperser, a kneader, a high speed mixer, a homogenizer, an ultrasonic wave dispersing machine, etc. can be used.

Kneading and dispersing techniques are described in T. C. Patton; *Paint Flow and Pigment Dispersion* John Wiley and Sons, New York (1964) and in U.S. Pat. Nos. 2,581,414 and 2,855,156.

Processes for coating the above-described magnetic recording composition as a layer on the support which can be used include an air doctor coating process, a blade coating process, an air knife coating process, a squeeze-coating process, an immerse-coating process, a reverse roll coating process, a transfer roll coating process, a gravure coating process, a kiss coating process, a cast coating process, a spray coating process and the like. Other processes can also be employed. Specific detailed descriptions of suitable coating techniques are given in *Coating Engineering*, pp.253-277 Asakura Shoten, Tokyo (Mar. 20, 1971).

The magnetic recording material of the present invention is prepared by coating a magnetic layer on a non-magnetic support according to the above-described coating process, and drying. Also, this coating procedure may be repeated to provide two or more magnetizable layers through continuous coating procedures. In addition, as is described in Japanese Patent Application (OPI) Nos. 98803/73 [corresponding West German Patent (DT-OS) No. 2,309,159], 99233/73 [corresponding West German Patent (DT-AS) No. 2,309,158], etc., two or more magnetic layers may be coated on the support using a multi-layer coating process.

Organic solvents which can be used upon coating include ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, ethyl lactate, glycol acetate monoethyl ether, etc.; ethers such as diethyl ether, glycol dimethyl ether, glycol monoethyl ether, dioxane, etc.; aromatic hydrocarbons such as benzene, toluene, xylene, etc.; chlorinated hydrocarbons such as methylene chloride, ethylene chloride, carbon tetrachloride, chloroform, ethylene chlorohydrin, dichlorobenzene, etc., and the like.

The magnetic layer coated on a support according to such processes is, if necessary, subjected to a process for orienting the ferromagnetic powder in the layers as described before, and the thus formed magnetic layer is dried. If necessary, the surface may be smoothened and the material is cut into the desired shapes to produce the magnetic recording material of the present invention. In particular, it has been discovered that, in the present invention, surface-smoothening the magnetic recording material provides magnetic recording materials having a smooth surface and excellent abrasion resistance.

The magnetic field for the ferromagnetic powder orientation can be about 500 to about 2,000 gauss (either a DC or AC magnetic field). A suitable drying temperature for the magnetic layer is about 50° to about 120° C., preferably 70° to 100° C., particularly preferably 80° to 90° C. using an ar flow rate of about 1 to about 5 Kl/m$^2$, preferably 2 to 3 Kl/m$^2$, with a drying time of about 30 seconds to about 10 minutes, preferably 1 to 5 minutes.

The direction of orienting the ferromagnetic material is determined by use thereof. That is, in the case of audio tapes, small-sized video tapes, memory tapes, etc., the orientation direction is parallel to the longitudinal direction of the tape, whereas in the case of video tapes for broadcasting, the orientation is at an angle of 30° to 90° with respect to the longitudinal direction of the tape.

Processes for orienting the ferromagnetic powder are also described in the following patents, for example, U.S. Pat. Nos. 1,949,840, 2,796,359, 3,001,891, 3,172,776, 3,416,949, 3,473,960, 3,681,138, Japanese Patent Publication Nos. 3427/57, 28268/64, 23624/65, 23625/65, 13181/66, 13043/73, 39722/73, etc.

Also, as is described in West German Patent (DT-AS) No. 1,190,985, an upper layer and an lower layer may be oriented in different directions in the magnetic recording material of this invention.

The processing of surface-smoothening the respective magnetic layers after drying is conducted using calendering, a smoothening sheet, or the like.

Calendering is preferably conducted using a supercalendering process comprising passing the magnetic recording material between two rolls of a metal roll and a cotton roll or a synthetic resin (e.g., nylon) roll. Conditions for the super-calendering generally are a between-roll pressure of about 25 to about 100 kg/cm$^2$, preferably 30 to 70 kg/cm$^2$, a temperature of about 35° to about 100° C., preferably 40° to 80° C., and a processing rate of about 5 to about 120 m/min. If the temperature and pressure exceed the upper limits set forth above, the magnetizable layer and the non-magnetizable support are detrimentally influenced. If the processing rate is less than about 5 m/min, a surface-smoothening effect is not obtained, whereas if the rate is more than about 120 m/min, processing procedures become difficult.

These surface-smoothening processings are described in U.S. Pat. Nos. 2,688,567, 2,998,325, 3,783,023, West German Pat. No. (DT-OS) 2,405,222, Japanese Patent Applications (OPI) Nos. 53631/74, 10337/75, etc.

The running properties and durability of the magnetic recording materials using ferromagnetic metal oxide powders as ferromagnetic materials are improved by adding the organic silicone compound of the present invention to a magnetic layer. It has also been found that the running properties and durability of the magnetic recording materials using ferromagnetic alloy powders are remarkably improved, which has so far been difficult. In addition, it has also surprisingly been found that the organic silicone compounds of the present invention show the effect of removing oxidative deterioration of ferromagnetic alloy powders.

The magnetic recording material using the organic silicone compound of the present invention has been found to reduce head abrasion to half or less as compared with that observed with conventional magnetic recording materials. It has also been found that the running properties are not deteriorated under conditions of high temperature (40° C.) and high humidity (above 80% RH).

The present invention will now be illustrated in more detail by reference to the following examples and comparative examples. It will be apparent to one skilled in the art that various changes and modifications can be made as to the components, proportions, order of procedures, and the like without departing from the spirit and scope of the present invention.

Therefore, the present invention should not be construed as being limited to the following examples in any way. Additionally, in the following examples and comparative examples, all parts, percentages, ratios and the like are by weight unless otherwise indicated.

EXAMPLE 1

| Magnetic Coating Composition A | Parts |
|---|---|
| Co-containing Berthollide iron oxide | 300 |
| (Co: 1.5 atomic %; FeO 1.4; HC: 610 Oe; particle length: 0.6 μm; axial ratio: 10:1) | |
| Vinyl Chloride-Vinylidene Chloride Copolymer | 27 |
| (Copolymerization ratio (mol): 7/3; polymerization degree: about 300) | |
| Polyesterpolyurethane | 28 |
| (Reaction product between polyethylene adipate and 4,4'-diphenylmethanediisocyanate; mean molecular weight (weight corresponding to styrene): about 130,000) | |
| Soybean Lecithin | 3 |
| Organic Silicone Compound (see Table 1 below) | 3 |
| Butyl Acetate | 500 |
| Methyl Ethyl Ketone | 200 |

The above-described composition was placed in a ball mill, and kneaded and dispersed for 24 hours. After adding thereto 14 parts of a polyisocyanate compound (Desmodur L-75, made by Bayer A. G.; a 75 wt % ethyl acetate solution of an adduct between 1 mol of trimethylolpropane and 3 mols of tolylenediisocyanate), the resulting mixture was subjected to high speed shearing and dispersing forces for 2 hours. After the above-described processing, the mixture was filtered through a filter having an average pore size of 3 μm to obtain Magnetic Coating Composition A.

This Magnetic Coating Composition A was coated on a 22 μm-thick polyethylene terephthalate film in a dry thickness of 6 μm using a doctor coating process. This was oriented for 0.02 second in a 2,500 Gauss direct current magnetic field, and dried for 2 minutes at 100° C. at an air flow rate of 3 Kl/m². Then, it was subjected to super-calender roll processing at a rate of 40 m/min at 60° C. under a pressure of 60 Kg/cm to obtain a wide magnetic recording film. This wide film was slit into video tapes of a width of ½ inch.

The organic silicone compounds used in Magnetic Coating Composition A (comparative examples are indicated by the designation C-No.) and characteristics of the resulting video tapes are shown in Table 1 below.

Table 1

| Sample No. | Organic Silicone Compound in Coating Composition A | Kinetic Coefficient of Friction* | | Durability** (Min) | Blooming*** |
|---|---|---|---|---|---|
| | | 100 g Load | 200 g Load | | |
| 1 | [I-1] | 0.17 | 0.30 | 100 | 5 |
| 2 | [I-2] | 0.21 | 0.29 | 90 | 5 |
| 3 | [I-3] | 0.21 | 0.27 | 120 | 5 |
| 4 | [I-4] | 0.25 | 0.32 | 90 | 5 |
| 5 | [I-5] | 0.16 | 0.30 | 110 | 5 |
| 6 | [I-6] | 0.23 | 0.31 | 70 | 5 |
| 7 | [I-7] | 0.19 | 0.28 | 90 | 5 |
| 8 | [I-8] | 0.21 | 0.31 | 80 | 5 |
| C-1 | — | 0.53 | — | 5 | 5 |
| C-2 | Dimethylpolysiloxane (mean molecular weight: about 60) | 0.38 | — | 30 | 1 |
| C-3 | Compound of General Formula [II]; R, R' = $C_{17}H_{33}$; n = 01 | 0.27 | 0.33 | 35 | 2 |
| C-4 | Compound of General Formula [III] R, R' = $C_{18}H_{37}$; m = 1. R" = $CH_3$ $n_1 + n_2 = 10$ | 0.21 | 0.37 | 40 | 3 |

The data for the respective samples was determined by using a measuring apparatus having the structure shown in FIG. 1. (In Table 1, Samples C-1 and C-2 showed too large a kinetic coefficient of friction to determine with a load of 200 g.) In FIG. 1, A designates a Y alloy drum of a diameter of 115.8 mm having a polished surface. Sample tape B is contacted at a relative velocity of 19.0 cm/sec due to the rotation of this drum (31.4 r.p.m.) for determination of the kinetic coefficient of friction. (This condition corresponds to the friction condition between a drum and a tape in a unified type VTR.) C designates a tension-detecting member, and D designates a weight applying tension to the tap. The kinetic coefficient of friction can be calculated according to the following formula (wherein Wo designates a load of weight D, and W designates the tension detected by C). The loads employed were 100 g and 200 g.

*[Kinetic Coefficient of Friction $(\mu) = 1/\pi \ln W/Wo$]
** [Durability (min.)]

The data was obtained by recording a test pattern using a unified type VTR (model AV-8700, made by SONY Corp.), reproducing the still image, and measuring the time (min.) at which the TV image underwent a change.
*** [Blooming]

Each sample tape was

The relation between load Wo (g) and kinetic coefficient of friction (μ) in Table 1 was measured using the apparatus shown in FIG. 1, and the results with samples 3, 5, C-1 and C-2 are shown in FIG. 2. In FIG. 2, kinetic coefficient of friction (μ) is plotted as the ordinate and weight Wo (g) is plotted as the abscissa.

EXAMPLE 2

| Magnetic Coating Composition B | Parts |
|---|---|
| Fe-Co-Cr (70:25:5 wt %) Alloy Powder | 300 |

| Magnetic Coating Composition B | Parts |
|---|---|
| (containing about 3 wt % B; Hc = 950 Oe; mean particle size: 400 A; mean chain length: 10 – 15 particles in number) | |
| Polyesterpolyurethane (same as in Magnetic Coating Composition A) | 20 |
| Synthetic Non-drying Oil-Modified Alkyd resin | 25 |
| (reaction product between glycerin, phthalic anhydride and synthetic non-drying oil; oil length: 29%; hydroxyl value: about 130) | |
| Oleic Acid | 3 |
| Organic Silicone Compound (see Table 2 below) | 3 |
| Butyl Acetate | 600 |

The above-described composition was placed in a ball mill, and keaded and dispersed for 24 hours. After adding thereto 20 parts of a polyisocyanate compound (Desmodur L-75, see Example 1), the mixture was subjected to high speed shearing and dispersion forces for 1 hour. After the above-described processing, the mixture was filtered through a filter having a mean pore size of 3μ to obtain Magnetic Coating Composition B.

The above-described Magnetic Coating Composition B was coated according to Example 1 in a dry thickness of 3 μm under drying conditions of a temperature of 100° C. and an air flow rate of 2 Kl/m², and a drying time of 2 minutes to obtain video tapes of a width of ½ inch.

The organic silicone compounds used in Magnetic Coating Composition B and the characteristics of these video tapes are shown in Table 2 below.

Table 2

| Sample No. | Organic Silicone Compound in Magnetic Coating Composition B | Kinetic Coefficient of Friction Load: 100 g | Kinetic Coefficient of Friction Load: 200 g | Durability (min) | Blooming | Deterioration with the Lapse of Time*(%) |
|---|---|---|---|---|---|---|
| 9 | [I-1] | 0.17 | 0.31 | 70 | 5 | 5 |
| 10 | [I-2] | 0.24 | 0.28 | 50 | 5 | 6 |
| 11 | [I-3] | 0.26 | 0.28 | 120 | 5 | 7 |
| 12 | [I-4] | 0.31 | 0.32 | 60 | 5 | 6 |
| 13 | [I-5] | 0.18 | 0.30 | 90 | 5 | 5 |
| 14 | [I-6] | 0.29 | 0.32 | 40 | 5 | 6 |
| 15 | [I-7] | 0.23 | 0.29 | 60 | 5 | 6 |
| 16 | [I-8] | 0.27 | 0.31 | 50 | 5 | 7 |
| C-5 | — | 0.52 | — | 15 | 5 | 18 |
| C-6 | Dimethylpolysiloxane (mean molecular weight: about 60) | 0.36 | — | 15 | 1 | 12 |
| C-7 | Compound of general formula [II]; R, R' = $C_{17}H_{33}$; n = 1 | 0.28 | 0.35 | 20 | 2 | 8 |
| C-8 | Compound of general formula [III]; R, R' = $C_{18}H_{37}$; m = 1, R" = $CH_3$, $n_1 + n_2$ = 10 | 0.20 | 0.39 | 25 | 3 | 9 |

*[Deterioration with the Lapse of Time (%)]

From the results obtained in Examples 1 and 2, i.e., as shown in Tables 1 and 2 and FIG. 2, it has been confirmed that the organic silicone compounds represented by the general formula [I] used in the present invention impart to a magnetic recording material a low kinetic coefficient of friction under the application of a high load, which was not imparted by conventional organic silicone compounds, and provide good durability without any blooming phenomenon.

In particular, the results in Table 2 show that the organic silicone compounds used in the present invention greatly increase the durability of magnetic recording materials containing ferromagnetic alloy powder as a ferromagnetic component, which has so far been low, and exhibit the effect of reducing the deterioration of the ferromagnetic alloy powder component with the lapse of time.

EXAMPLE 3

Using the same steps and under the same conditions as in Example 2 except for changing R and R' in the organic silicone compound of the general formula [I] in Magnetic CoatingComposition B as shown in Table 3, video tapes of a width of ½ inch were obtained. The characteristics of each sample are shown in the Table 3 below.

Table 3

| Sample No. | Compound of General Formula [I] in Magnetic Coating Composition B | Kinetic Coefficient of Friction Load 100 g | Kinetic Coefficient of Friction Load 200 g | Durability (min) | Blooming | Deterioration with the Lapse of Time % |
|---|---|---|---|---|---|---|
| C-9 | R, R', R" = $C_3H_7$: m = 3, n = 15 | 0.30 | 0.38 | 10 | 5 | 8 |
| C-10 | R, R', R' = $C_5H_{11}$; m = 3, n = 15 | 0.30 | 0.36 | 15 | 5 | 7 |
| 14 | [I-6] | 0.29 | 0.32 | 40 | 5 | 6 |
| 10 | [I-2] | 0.24 | 0.28 | 50 | 5 | 6 |
| 15 | [I-7] | 0.23 | 0.29 | 60 | 5 | 6 |
| 16 | [I-8] | 0.27 | 0.31 | 50 | 5 | 7 |
| C-11 | R, R', R" = $C_{25}H_{51}$; m = 3, n = 15 | 0.31 | 0.42 | 40 | 4 | 5 |

It has been confirmed from the results in Table 3 that the number of carbon atoms in R, R' and R" in the organic silicone compounds used in the present invention is preferably 7–21, where the kinetic coefficient of friction is low and the durability is high. When the number of carbon atoms exceeded 22, the kinetic coefficient of friction was not improved as much.

EXAMPLE 4

Using the same steps and under the same conditions as in Example 2 except for changing m and n in the organic silicone compuound of the general formula [I] in Magnetic Coating Composition B as shown in Table 4, video tapes of a width of ½ inch were obtained. The characteristics of each sample are shown in the Table 4 below.

Table 4

| Sample No. | Compound of General Formula [I] in Coating Composition B | Kinetic Coefficient of Friction Load 100 g | Kinetic Coefficient of Friction Load 200 g | Durability (min) | Blooming | Deterioration with the Lapse of Time % |
|---|---|---|---|---|---|---|
| 10 | [I-2], R,R', R" = $C_{13}H_{27}$; m = 3, n = 15 | 0.24 | 0.28 | 50 | 5 | 6 |
| 17 | [I-9], R,R',R" = $C_{13}H_{27}$; m = 15, n = 45 | 0.25 | 0.29 | 70 | 5 | 6 |
| 18 | [I-10], R,R',R" = $C_{13}H_{27}$; m = 30, n = 150 | 0.27 | 0.28 | 50 | 5 | 6 |
| 19 | [I-11], R,R',R" = $C_{13}H_{27}$; m = 50, n = 250 | 0.32 | 0.32 | 40 | 5 | 6 |
| C-12 | R, R', R" = $C_{13}H_{27}$; m = 60, n = 300 | 0.31 | 0.35 | 30 | 5 | 6 |

It can be seen from the results in Table 4 that, when m + n in the organic silicone compound of the general formula [I] used in the present invention is not less than about 300, the kinetic coefficient of friction and durability are not improved.

Taking the results in Table 2 into consideration, it is seen that m + n is particularly preferably not more than 100 for increasing durability.

EXAMPLE 5

Using the same steps and under the same conditions as in Example 2 except for changing m and n in the organic silicone compound of the general formula [I] in Magnetic Coating Composition B as given in Table 2, video tapes of a width of ½ inch were obtained. The characteristics of each sample are shown in Table 5 below.

Table 5

| Sample No. | Compound of General Formula [I] in Magnetic Composition B | Kinetic Coefficient of Friction Load 100 g | Kinetic Coefficient of Friction Load 200 g | Durability (min) | Blooming | Deterioration with the Lapse of Time % |
|---|---|---|---|---|---|---|
| 18 | [I-10] R, R', R" = $C_{13}H_{27}$; m = 30, n = 150 | 0.27 | 0.28 | 50 | 5 | 6 |
| C-13 | R, R', R" = $C_{13}H_{27}$; m = 0, n = 150 | 0.33 | 0.39 | 25 | 4 | 8 |
| C-14 | R, R', R" = $C_{13}H_{27}$; m = 0, n = 150 | 0.39 | — | 20 | 2 | 11 |

It can be seen from the above results that the kinetic coefficient of friction and durability can not be improved unless the proportion of m and n in the organic silicone compounds of the general formula [I] the present invention is m ≧ n/5.

EXAMPLE 6

In the same manner as in Example 2 except for changing the amount of the organic silicone compound (Sample 11) in Magnetic Coating Composition B in Example 2, video tapes of a width of ½ inch were obtained. Table 6 shows the amounts added, the silicone compounds of the general formula [I] used, and the characteristics of each sample obtained.

Table 6

| Sample No. | Silicone Compound of General Formula [I] | Amount Added (by wt.) | Kinetic Coefficient of Friction Load 100 g | Kinetic Coefficient of Friction Load 200 g | Durability (min) | Blooming |
|---|---|---|---|---|---|---|
| 20 | [I-3] | 0.3 | 0.29 | 0.31 | 80 | 5 |
| 21 | [I-3] | 0.6 | 0.27 | 0.29 | 100 | 5 |
| 11 | [I-3] | 3.0 | 0.26 | 0.28 | 120 | 5 |
| 22 | [I-3] | 9.0 | 0.25 | 0.27 | 120 | 5 |
| 23 | [I-3] | 15.0 | 0.25 | 0.27 | 100 | 3 |
| C-15 | [I-3] | 30.0 | 0.26 | 0.29 | 20 | 1 |

From the above results, it has been confirmed that the organic silicone compounds used in the present invention represented by the general formula [I] can be added in an amount of 0.1 to 5 parts by weight per 100 parts by weight of the ferromagnetic powder, with the amount of 0.2 to 3 parts by weight being particularly preferred for obtaining advantageous characteristics.

EXAMPLE 7

In the same manner as in Example 1 except for using as a magnetic coating composition that prepared by adding 6 parts of $Cr_2O_3$ (chromium sesquioxide; mean particle size: 0.5 μm; Mohs' hardness: 8) as an abrasive to the composition of the Magnetic Coating Composition B in Example 2, a video tape of a width of ½ inch (Sample 24) was obtained. The characteristics of this sample are shown in Table 7 below together with the characteristics of Sample 11.

Table 7

| Sample No. | Silicone Compound of General Formula [I] | Abrasive | Kinetic Coefficient of Friction Load 100 g | Load 200 g | Durability (min) | Blooming |
|---|---|---|---|---|---|---|
| 11 | [I-3] | — | 0.26 | 0.28 | 120 | 5 |
| 24 | [I-3] | $Cr_2O_3$ | 0.26 | 0.29 | 180 | 5 |

The above results confirm that the combined use of the abrasive served to further improve the durability.

EXAMPLE 8

In the same manner as in Example 2 except for using as a magnetic coating composition that prepared by adding 2 parts of amyl stearate as a lubricant to the composition of Magnetic Coating Composition B, a video tape of a width of ½ inch (Sample 25) was obtained. The characteristics of this sample are shown in Table 8 below together with the characteristics of Sample 11.

Table 8

| Sample No. | Silicone Compound of General Formula[I] | Lubricant | Kinetic Coefficient of Friction Load 100 g | Load 200 g | Durability (min) | Blooming |
|---|---|---|---|---|---|---|
| 11 | [I-3] | — | 0.26 | 0.28 | 120 | 5 |
| 25 | [I-3] | Amyl stearate | 0.24 | 0.27 | 160 | 5 |

The above results confirm that the combined use of the lubricant served to further improve the durability.

EXAMPLE 9

In the same manner as in Example 1 except for changing Organic Silicone Compound [I-2] to [I-14] in the composition of Sample 10 in Magnetic Coating Composition B, a video tape of a width of ½ inch (Sample 26) was obtained.

The characteristics of this sample are shown in Table 9 below together with the characteristics of Sample 10.

Table 9

| Sample No. | Silicone Compound of General Formula [I] | Kinetic Coefficient of Friction Load 100 g | Load 200 g | Durability (min) | Blooming | Deterioration with the lapse of Time (%) |
|---|---|---|---|---|---|---|
| 10 | [I-2] | 0.24 | 0.28 | 50 | 5 | 6 |
| 26 | [I-12] | 0.23 | 0.26 | 60 | 5 | 5 |

From the above results, it was confirmed that the organic silicone compounds represented by the general formula [I] and used in the present invention containing different R, R' and R" substituents provided similar effects and that, between Organic Silicone Compounds [I-2] and [I-12], the latter compound improved the characteristics to a greater extent.

EXAMPLE 10

In the same manner as in Example 2 except for using two organic silicone compounds in the composition of Sample 10 in Magnetic Coating Composition B as shown in Table 10 below, a video tape of a width of ½ inch (Sample 27) was obtained. The characteristics of this sample are shown in Table 10 below together with the characteristics of Sample 10.

Table 10

| Sample No. | Silicone Compound of General Formula [I] | Amount Added | Kinetic Coefficient of friction Load 100 g | Load 200 g | Durability (min) | Blooming |
|---|---|---|---|---|---|---|
| 10 | [I-2] | 3 | 0.24 | 0.28 | 50 | 5 |
| 27 | [I-2] | 2 | 0.25 | 0.28 | 70 | 5 |
|  | [I-3] | 1 |  |  |  |  |

The above results confirm that the organic silicone compounds represented by the general formula [I] used in the present invention showed the same effects when used as a combination of two thereof.

While the invention has been described in detail and with reference to specific embodiments thereof, it will be apparent to one skilled in the art that various changes and modifications can be made therein without departing from the spirit and scope thereof.

What is claimed is:

1. A magnetic recording material, which comprises a non-magnetic support having thereon a magnetic layer containing ferromagnetic powder dispersed in a binder, with the magnetic layer containing an organic silicone compound represented by the following general formula [I];

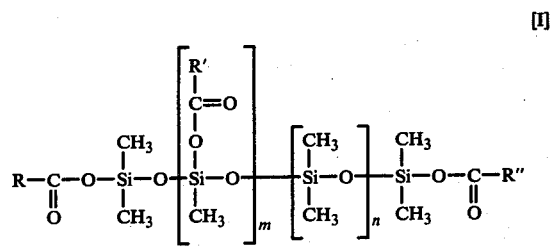

wherein R, R' and R", which may be the same or different, each has 7 to 21 carbon atoms and represents an alkyl group, an alkenyl group, an alkadienyl group, an alkatrienyl group or an alkatetraenyl group; m represents an integer of 1 to 100; n represents an integer of 0 to 250; and m + n ≦ 300 and m ≧ n/5.

2. The magnetic recording material of claim 1, wherein m + n of said organic silicone compound represented by the general formula [I] is not more than 100.

3. The magnetic recording material of claim 1, wherein R, R' and R" in said organic silicone compound represented by the general formula [I] each represents an alkyl group, an alkenyl group, an alkadenyl group or an alkatrienyl group, each having 7 to 21 carbon atoms.

4. The magnetic recording material of claim 3, wherein R, R' and R" in said organic silicone compound represented by the general formula [I] each represents an alkyl group selected from the group consisting of a capryl group, a myristyl group and a behenyl group.

5. The magnetic recording material of claim 3, wherein R, R' and R'' in said organic silicone compound represented by the general formula [I] each represents an alkenyl group selected from the group consisting of an oleyl group and a linolyl group.

6. The magnetic recording material of claim 1, wherein said organic silicone compound represented by the general formula [I] is present in said magnetic layer in an amount of about 0.1 to 5 parts by weight per 100 parts by weight of said ferromagnetic powder.

7. The magnetic recording material of claim 1, wherein the weight ratio of said ferromagnetic powder and said binder is such that about 10 to 400 parts by weight of the binder is present per 100 parts by weight of the ferromagnetic powder.

8. The magnetic recording material of claim 7, wherein about 0.5 to about 20 parts by weight of a dispersing agent is present in said magnetic layer per 100 parts by weight of said ferromagnetic powder.

9. The magnetic recording material of claim 7, wherein about 0.2 to about 20 parts by weight of a lubricant is present in said magnetic layer per 100 parts by weight of said ferromagnetic powder.

10. The magnetic recording material of claim 7, wherein about 0.5 to about 20 parts by weight of an abrasive having a Mohs' hardness of not less than 5 and having a mean particle size of about 0.05 to about 5 µm is present in said magnetic layer per 100 parts by weight of said ferromagnetic powder.

11. The magnetic recording material of claim 7, wherein about 0.02 to about 20 parts by weight of an electrically conductive powder is present as an antistatic agent in said magnetic layer per 100 parts by weight of said ferromagnetic powder.

12. The magnetic recording material of claim 7, wherein about 0.1 to about 10 parts by weight of a surface active agent is present as an antistatic agent in said magnetic layer per 100 parts by weight of said ferromagnetic powder.

13. The magnetic recording material of claim 1, wherein said ferromagnetic powder is a ferromagnetic iron oxide or ferromagnetic chromium dioxide, having an axial ratio of about 2:1 to about 20:1 and having an average length of about 0.2 to about 2.0 µm.

14. The magnetic recording material of claim 13, wherein said ferromagnetic iron oxide contains 0 to about 10 atomic % of at least one divalent metal selected from the group consisting of Cr, Mn, Co, Ni, Cu and Zn.

15. The magnetic recording material of claim 13, wherein said ferromagnetic iron oxide is Berthollide iron oxide.

16. The magnetic recording material of claim 14, wherein said ferromagnetic iron oxide is Berthollide iron oxide.

17. The magnetic recording material of claim 1, wherein said ferromagnetic powder is a ferromagnetic alloy powder comprising needle-like particles wherein about 2 to about 20 particles of a length of about 50 to about 1,000 A are connected to each other as a chain.

18. The magnetic recording material of claim 1, wherein said non-magnetic support is a film, a tape, or a sheet of a thickness of about 2 to about 50 µm.

19. The magnetic recording material of claim 1, wherein said non-magnetic support is a disc or a card of a thickness of about 0.5 to about 10 mm.

20. A magnetic recording material which comprises a non-magnetic support having thereon a magnetic layer containing ferromagnetic powder dispersed in a binder, with the magnetic layer containing 0.1 to 5 parts by weight per 100 parts ferromagnetic powder of an organic silicone compound represented by the following general formula [I];

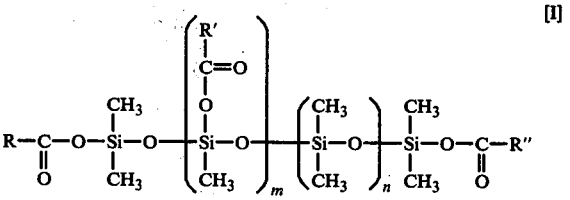

wherein R, R' and R'', which may be the same or different, each has 7 to 21 carbon atoms and represents an alkyl group, an alkenyl group, an alkadienyl group, or an alkatrienyl group; m represents an integer of 1 to 100; n represents an integer of 0 to 250; and m + n ≦ 100 and m ≧ n/5.

21. The magnetic recording material of claim 20, wherein R, R' and R'' in said organic silicone compound represented by the general formula [I] each represents an alkyl group selected from the group consisting of a capryl group, a myristyl group and a behenyl group.

22. The magnetic recording material of claim 20, wherein R, R' and R'' in said organic silicone compound represented by the general formula [I] each represents an alkenyl group selected from the group consisting of an oleyl group and a linolyl group.

23. The magnetic recording material of claim 20, wherein the weight ratio of said ferromagnetic powder and said binder is such that about 10 to 400 parts by weight of the binder is present per 100 parts by weight of the ferromagnetic powder.

* * * * *